United States Patent
Dawes et al.

(10) Patent No.: US 6,519,380 B2
(45) Date of Patent: Feb. 11, 2003

(54) ATHERMALIZED INTEGRATED OPTICAL WAVEGUIDE DEVICES

(75) Inventors: Steven B. Dawes, Corning, NY (US); Marc Moroni, Fontainebleau (FR); Sophie Vallon, St. Michel sur Orge (FR)

(73) Assignee: Corning Incorporated, Corning, NY (US)

( * ) Notice: Subject to any disclaimer, the term of this patent is extended or adjusted under 35 U.S.C. 154(b) by 112 days.

(21) Appl. No.: 09/757,884

(22) Filed: Jan. 10, 2001

(65) Prior Publication Data

US 2001/0016093 A1 Aug. 23, 2001

(51) Int. Cl.$^7$ ................................................. G02B 6/12
(52) U.S. Cl. ...................... 385/14; 385/122; 385/130; 385/132; 385/142
(58) Field of Search ...................... 385/14, 122, 123, 385/124, 125, 126–132, 142

(56) References Cited

U.S. PATENT DOCUMENTS

| | | |
|---|---|---|
| 4,985,308 A | 1/1991 | Squire |
| 5,224,185 A | 6/1993 | Ito et al. ................. 385/40 |
| 5,799,118 A | 8/1998 | Ogusu et al. |
| 5,857,039 A | 1/1999 | Bosc et al. |
| 5,885,881 A | 3/1999 | Ojha ................. 385/130 X |
| 5,938,811 A | 8/1999 | Greene |
| 6,002,823 A | 12/1999 | Chandross et al. |
| 6,118,909 A | 9/2000 | Chen et al. |
| 6,144,795 A | 11/2000 | Dawes et al. ........... 385/141 |
| 6,169,838 B1 | 1/2001 | He et al. |
| 6,421,472 B1 * | 7/2002 | Moroni et al. ........... 385/14 |

FOREIGN PATENT DOCUMENTS

| | | |
|---|---|---|
| CA | 2291405 | 10/2000 |
| EP | 0 797 113 | 9/1997 |
| JP | 10-273615 | 10/1998 |
| WO | WO/98/26315 | 6/1996 |
| WO | WO98/25862 | 6/1998 |
| WO | WO/98/25862 | 6/1998 |
| WO | WO98/26315 | 6/1998 |
| WO | WO 98/36299 | 8/1998 |
| WO | WO99/21038 | 4/1999 |
| WO | WO 99/21038 | 4/1999 |
| WO | WO 00/28355 | 5/2000 |
| WO | WO 00/46621 | 8/2000 |

OTHER PUBLICATIONS

Dawes 13–5, Provisional Application No. 60/118,946 filed Feb. 5, 1999, Steven Dawes & R. Hagerty, "Optical fiber component with shaped optical element and method of making same".

Dawes et ak,—"Optical Fiber Device with Insitu Shaped Optical Element and Method of Making"—Provisional application. Corning Incorporated 60/118,946.

Kokubun Y et al.—"Athermal Waveguides for Temperature–Independent Lightwaves Devices"—IEEE Photonics Technology Letters, US, IEEE Inc. New York—vol. 5, Nov. 11, 1993, pp. 1297–1300.

Inoue Y et al.—"Athermal Silica–Based Arrayed Waveguide Grating (AWG) Multiplexer"—IOOC–ECOC. European Conference on Optical Communication ECOC. International Conference on Integrated Optics and Optical Fibre Communication IOOC. Sep. 22, 1997, XP002058688.

(List continued on next page.)

Primary Examiner—Phan T. H. Palmer
(74) Attorney, Agent, or Firm—James V. Suggs (57) ABSTRACT

The present invention provides an athermalized organic-containing overclad integrated planar optical waveguide circuit device in which thermal induced shifting of channel wavelengths is minimized. The organic-containing overclad material is combined with a silica or doped silica glass material in the form of a local overclad, a bi-layer overclad, or a hybrid overclad. The organic-containing overclad material is a polymer or a sol-gel material.

14 Claims, 6 Drawing Sheets

OTHER PUBLICATIONS

E. Wildermuth et al., "Penalty–free polarisation compensation of $SiO_2$/Si arrayed waveguide grating wavelength multiplexers using stress release grooves", Electronics Letters, Aug. 20, 1998, vol. 34, No. 17, pp. 1661–1663.

M. Zirngibl et al., "Polarisation compensated waveguide grating router on InP", Electronic Letters, Sep. 14, 1995, vol. 31, No. 19, pp. 1662–1664.

Takahashi, Hiroshi et al., "Polarization–insensitive arrayed–waveguide grating multiplexer with birefringence–controlling a–Si film", Proc. LEOS Nov. 1992, Boston, pp. 688–689.

Tanobe et al. "A Temperature Insensitive InGaAsP–InP Optical Filter", IEEE Photonics Technology Letters, vol. 8, No. 11, pp. 1489–1491, Nov. 1996.

Bosc et al., "Temperature and polarisation insensitive Bragg gratings realised on silica waveguide on silicon", Electronic Letters, vol. 33, No. 2, pp. 134–136, Jan. 16, 1997.

Kokubun et al. "Temperature–independent narrowband optical filter at 1.3 $\mu$m wavelength by an athermal waveguide", Electronic Letters, vol. 32, No. 21, pp. 1998–1999, Oct. 10, 1996.

Kokubun et al. "Temperature–independent optical filter at 1.55 $\mu$m wavelength using a silica–based athermal waveguide", Electronic Letters, vol. 34, No. 4, pp. 367–369, Feb. 19, 1998.

Kokubun et al. "Three–dimensional athermal waveguides for temperature independent lightwave devices", Electronic Letters, vol. 30, No. 15, pp. 1223–1224, Jul. 21, 1994.

Watanabe et al. "Polymeric arrayed–waveguide grating multiplexer wide tuning range", Electronic Letters, vol. 33, No. 18, pp. 1547–1548, Aug. 28, 1997.

Pitois et al., "Low–Loss Passive Optical Waveguides Based on Photosensitive Poly(pentafluorostyrene–co–glycidyl methacrylate)," Macromolecules 1999, 32, 2903–2909.

* cited by examiner

ATHERMALIZED INTEGRATED OPTICAL WAVEGUIDE DEVICES

FIELD OF THE INVENTION

The present invention is directed to integrated optical waveguide devices in which the light transmitting properties are insensitive to temperature variations and fluctuations. More particularly, the present invention is directed to athermalized integrated planar optical waveguide devices with organic-containing overclads containing silicate glasses, polymers, and/or hybrid (organic/inorganic) sol-gels.

BACKGROUND OF THE INVENTION

Integrated optical waveguide devices, such as integrated optical circuits, combine miniaturized waveguides and optical devices into a functional optical system incorporated onto a small planar substrate. Such integrated optical waveguide devices are utilized in, for example, optical communications systems, usually by attaching optical waveguide fibers that transmit light signals to the integrated optical waveguide device as inputs and outputs. The integrated optical waveguide device performs a function or process on the transmitted light in the optical communications system.

Integrated optical devices which incorporate optical path length differences can be used as, for example, wavelength multiplexing and demultiplexing devices. Such integrated optical devices are particularly useful as wavelength division multiplexers (WDM)/demultiplexers, and may incorporate a phased array made from a plurality of different waveguide core arms which have differences in optical path length.

Wavelength division demultiplexers include, in particular, at least one input waveguide, which transmits N optical signals at N different wavelengths ($\lambda_1, \lambda_2, \ldots \lambda_N$), and at least N output waveguides, each transmitting one of the N optical signals at a predetermined wavelength $\lambda_i$ (i=1, 2, . . . N). Conversely, wavelength division multiplexers include at least N input waveguides, each transmitting one of the N optical signals at the wavelengths $\lambda_1, \lambda_2, \ldots \lambda_N$ and at least one output waveguide, which transmits the N optical signals. The wavelengths $\lambda_1, \lambda_2, \ldots \lambda_N$ of the N optical signals preferably are equal to the channel center wavelengths, where the transmission spectra of the real device show the lowest losses. Any perturbation inducing a change in the channel center wavelengths of the device is preferably avoided.

WDMs, such as phasars, require precise control of the optical path difference (OPD) between adjacent waveguide paths of the phased array. The OPD can be expressed as n×ΔL, where n is the effective index of the fundamental mode in the optical waveguide path, and ΔL is the physical path length difference between adjacent waveguide paths. The mean channel wavelength $\lambda_0$ is determined by $m\lambda_0$=OPD=n×ΔL, where m is the diffraction order. Any shift of the mean channel wavelength induces the same shift on the channel center wavelengths. Since n and ΔL usually both depend on temperature, the available integrated optical waveguide devices require temperature regulation to avoid a wavelength shift with temperature. Although such devices provide good performance at consistent standard room temperatures, the devices exhibit poor performance when used in environments where they are exposed to thermal variations and fluctuations in temperature. In such integrated devices, thermal shifts of the channel center wavelengths of greater than one tenth of the channel spacing at a transmitting wavelength in the 1550 nm range can limit their usefulness in environments of differing temperature. Silica-based phasars show a channel wavelength shift of about 0.01 nm/° C., while channel spacings are currently of 0.4 to 1.6 nm, which limits their use to small temperature ranges. Thus, use of integrated optical waveguide devices is limited by their temperature dependence.

Presently, the application of integrated optical waveguide devices has been hindered by the requirement to consistently maintain the temperature of the device such as by actively heating or cooling the device. While such costly and energy consuming heating and cooling may suffice in a laboratory setting, there is a need for an integrated optical waveguide device that is manufacturable and can be deployed in the field and operate properly when subjected to temperature changes. Accordingly, the present invention is directed to athermalized integrated optical devices that can be manufactured, packaged, and/or used without the requirement for temperature control.

SUMMARY OF THE INVENTION

The present invention is directed, in part, to an integrated optical waveguide device that substantially obviates one or more of the problems due to the limitations and disadvantages of the related art. The present invention provides, in part, an athermalized integrated optical waveguide device comprising a thermal shift compensating negative dn/dT organic-containing overclad, such as a polymer or sol-gel, which inhibits the shifting of channel wavelengths due to variations in operating temperature within a predetermined operating temperature range. In a preferred embodiment of the invention, an athermalized phased array wavelength division multiplexer/demultiplexer is provided.

Additional features and advantages of the invention will be set forth in the description that follows, and in part will be apparent from the description or may be learned by practice of the invention. The objectives and other advantages of the invention will be realized and attained by the apparatus, compositions, and methods particularly pointed out in the written description and claims hereof as well as the appended drawings.

To achieve these and other advantages and in accordance with the purposes of the invention, as embodied and broadly described, the invention provides an integrated optical waveguide circuit device that includes a doped silica waveguide circuit core supported on a planar substrate. The planar substrate is preferably a solid flat substrate (such as a silica wafer or a silicon wafer) which may further include an underclad or buffer layer (such as an undoped or lightly doped silica layer). The doped silica waveguide circuit core has a first waveguide path and at least a second waveguide path, wherein the waveguide paths have a difference of ΔL of path length that is selected to provide an optical path difference which corresponds to suitable channel wavelengths λ in the range of 1500–1600 nm and to a suitable free spectral range (with respect to the number of channels and to the channel spacing).

Preferred optical waveguide devices of the invention include a thermal shift compensating negative dn/dT organic-containing overclad, such as a polymer or sol-gel, which may be used in combination with a doped silica (or silicate glass) partial overclad. The organic-containing overclad (together, if applicable, with the doped silica partial overclad) clads the doped silica waveguide circuit core. The organic-containing overclad is preferably made of a polymer material, or of a sol-gel material, and is preferably used in combination with a silicate glass as a local overclad, a bi-layer overclad, or a hybrid overclad. The overclad covers and encapsulates the waveguide circuit core. Preferably, the organic-containing overclad has a negative variation in refractive index versus temperature (dn/dT). The organic-containing material and the geometrical parameters of the device are selected such that the organic-containing material's negative variation in refractive index versus temperature (dn/dT) restricts the shift in the channel center wavelengths to less than 0.10 nm, preferably less than 0.05 nm, when the device is subjected to a temperature variation within the operating range of 0° C. to 70° C.

In a preferred embodiment of the invention, the device is a wavelength division multiplexer/demultiplexer with the waveguide paths forming a phased array. In other preferred embodiments of the invention, the athermalized integrated optical phased array wavelength division multiplexer/demultiplexer comprises a doped silica waveguide core on a planar substrate that is overcladded, in part, with a silicate glass overclad, and in part with a polymer comprised of fluorinated monomers or with a hybrid organic/inorganic sol-gel.

Other preferred athermalized optical telecommunications wavelength division multiplexer/demultiplexer integrated waveguide circuit devices comprise a doped silica waveguide circuit core supported on a planar substrate, wherein the silica waveguide circuit core includes a multiplexing/demultiplexing circuit region (phased array) for multiplexing/demultiplexing a plurality of optical telecommunications wavelength channels. The device also comprises an inhomogeneous waveguide circuit overcladding including a first waveguide overcladding material and a second waveguide overcladding material. The device guides optical telecommunications light in a waveguide core power distribution and in a waveguide overcladding power distribution, wherein a first portion of light guided in the waveguide overcladding power distribution is guided through the first waveguide overcladding material and a second portion of light guided in the waveguide overcladding power distribution is guided through the second waveguide overcladding material such that a thermally induced wavelength shift in the channel wavelengths of the multiplexing/demultiplexing device is inhibited to less than 0.10 nm when the device is subjected to a temperature variation within the range of 0 to 70° C. The thermally induced wavelength shift in the channel wavelengths of said multiplexing/demultiplexing device can be inhibited to less than 0.05 nm. The first waveguide overcladding material is preferably an organic containing optical material and the second waveguide overcladding material is preferably an inorganic optical material. The first waveguide overcladding material preferably has a negative variation in refractive index versus temperature and the second waveguide overcladding material preferably has a positive variation in refractive index versus temperature. The first waveguide overcladding material negative variation in refractive index versus temperature is preferably less than $-5 \times 10^{-5}$ $C.^{-1}$ and the second waveguide overcladding material positive variation in refractive index versus temperature is usually more than $5 \times 10^{-6}$ $C.^{-1}$.

The present invention also comprises a method of making an optical waveguide wavelength division multiplexer/demultiplexer device. The method includes the steps of providing a planar substrate, and forming a doped silica waveguide core on the planar substrate with the waveguide core incorporating an optical path length difference which corresponds to suitable channel wavelengths $\lambda$ in the range of 1500–1600 nm. The method further includes overcladding the doped silica waveguide core with a polymer overclad having a negative variation in refractive index versus temperature (dn/dT), wherein the polymer overclad inhibits the shift of the channel center wavelengths when the device is subjected to a variation in temperature.

In a preferred embodiment of the invention, a method of making an athermalized optical telecommunications wavelength division multiplexer/demultiplexer integrated waveguide circuit device comprises providing a waveguide circuit core supported on a planar substrate including a waveguide undercladding, which can be a buffer layer or the substrate itself. The waveguide circuit core material and the waveguide undercladding material preferably have a positive variation in refractive index versus temperature. The waveguide circuit core preferably includes a multiplexing/demultiplexing circuit region for multiplexing/demultiplexing a plurality of optical telecommunications wavelength channels. An inhomogeneous waveguide circuit overcladding including a first waveguide overcladding material and a second waveguide overcladding material is provided. The first waveguide overcladding material preferably has a negative variation in refractive index versus temperature and the second waveguide overcladding material preferably has a positive variation in refractive index versus temperature. The positive variation in refractive index versus temperature of the waveguide circuit core, of the waveguide undercladding material and of the second waveguide overcladding material are compensated by the negative variation in refractive index versus temperature of the first waveguide overcladding material, wherein either 1) light is guided by the waveguide circuit core, the waveguide undercladding material and the first waveguide overcladding material in one part of the device, and guided by the waveguide circuit core, the waveguide undercladding material and the second waveguide overcladding material in the other part of the device; or 2) the first waveguide overcladding material is superimposed on the second waveguide overcladding material such that a first portion of light is guided by the waveguide circuit core, the waveguide undercladding material and the second waveguide overcladding material, while a second portion of light is guided by the first waveguide overcladding material; or 3) the second waveguide overcladding material is mixed to the first waveguide overcladding material to produce a hybrid waveguide overcladding material and light is guided by the waveguide circuit core, the waveguide undercladding material and the hybrid waveguide overcladding material, such that a thermally induced wavelength shift in the channel wavelengths of the multiplexing/demultiplexing device is inhibited to less than 0.10 nm when the device is subjected to a temperature variation within the range of 0 to 70° C. The thermally induced wavelength shift in the channel wavelengths of the multiplexing/demultiplexing device is preferably inhibited to less than 0.05 nm.

The accompanying drawings are included to provide a further understanding of the invention and are incorporated in and constitute a part of this specification, illustrate embodiments of the invention, and together with the description serve to explain the principles of the invention.

DETAILED DESCRIPTION OF PREFERRED EMBODIMENTS

The present invention comprises, in part, athermalized integrated optical waveguide devices comprising an organic-containing overclad which inhibits the shifting of channel wavelengths due to variations in operating temperature within a predetermined operating temperature range.

Integrated optical waveguide devices are well known to the skilled artisan and are described in detail throughout the literature. Exemplary integrated optical waveguide devices preferably include a doped silica waveguide circuit core on a planar substrate, preferably a flat planar silica substrate, such as a fused silica member, or a silicon wafer with a silica buffer layer.

In preferred embodiments of the invention, the integrated optical waveguide device is a phased array wavelength division multiplexer/demultiplexer with a circuit core having a phased array of waveguide paths. Such devices are well known to the skilled artisan. In some preferred embodiments of the invention, the silica waveguide circuit core is comprised of a first waveguide path and at least a second waveguide path which are preferably adjacent and substantially parallel. The present invention, however, encompasses a phased array of a multitude of waveguide paths, with the phased arrays having upwards of several hundreds of waveguide paths. In the case of a demultiplexer device, a wavelength multiplexed signal is inputted into the device via an input waveguide with the multiplexed signal comprised of multiple wavelengths $\lambda_1, \lambda_2, \ldots \lambda_N$. A coupler region then couples the multiple wavelength signal into the waveguide paths of the phased array. The phased array demultiplexes (separates) the wavelengths $\lambda_1$ through $\lambda_N$ such that they are coupled through a second coupler into their individual channel output waveguides that exit the device. Conversely, in the case of a phased array multiplexer, the wavelengths $\lambda_1$ through $\lambda_N$ are inputted into the device via their individual channel input waveguide and coupled into the waveguide paths of the phased array by a first coupler region. The phased array combines the wavelengths $\lambda_1$ through $\lambda_N$ such that they are coupled through a second coupler into a common output waveguide. In both the demultiplexer and the multiplexer devices, the phased array waveguide paths have a path length difference $\Delta L$ that is selected to provide an optical path difference which corresponds to the wavelengths $\lambda_1, \lambda_2, \ldots \lambda_N$ of the multiplexed signal. The optical path difference is preferably selected to correspond to suitable wavelengths $\lambda_1, \lambda_2, \ldots \lambda_N$ in the range of 1500–1600 nm and to a suitable free spectral range.

The variation of mean channel wavelength with temperature in commercially available optical devices is expressed in the following Equation 1, where $\lambda$ is the mean channel wavelength and T the temperature:

$$d\lambda/dT=\lambda(1/n\times dn/dT+1/\Delta L\times d\Delta L/dT) \qquad (1)$$

Both the effective index n and the physical path length difference $\Delta L$ are temperature dependent. The value of dn/dT is about $10^{-5°}$ C.$^{-1}$ for silica and can range approximately between $-4\times10^{-4°}$ C.$^{-1}$ and $-5\times10^{-5°}$ C.$^{-1}$ for polymers. The second term, "$1/\Delta L\times d\Delta L/dT$," which corresponds to the coefficient of thermal expansion of the substrate, is about $5.5\times10^{-7°}$ C.$^{-1}$ for a silica substrate. It can be neglected in first approximation or can be canceled with a slightly negative dn/dT. The organic-containing overclads of the invention provide a negative variation of their refractive index versus temperature. The optical waveguide devices of the invention comprise a planar substrate (comprising at least a silica substrate or a silica underclad), a doped silica core, and an overclad comprising at least an organic-containing part, and if applicable a silicate glass part. The fundamental mode effective index of the optical waveguide devices of the invention depends on the doped silica core material index (positive dn/dT), on the silica underclad or substrate material index (positive dn/dT), if applicable on the silicate glass overclad material index (positive dn/dT) and on the organic-containing overclad material index (negative dn/dT). The optical signals in the preferred devices propagate not only in the core, but also in the clad. The organic-containing overclad compensates for the thermal effects (index and physical path) on the silica-containing parts (underclad, core, and if applicable overclad), and cancels the temperature dependence of the device, so that the shift of channel center wavelengths is inhibited to less than about 0.01 nm, preferably less than about 0.05 nm at temperatures in the working range of 0° to 70° C. Since silica presents a positive dn/dT, the use of organic-containing overclad materials, such as polymers or sol-gels, which have negative dn/dT values, makes it possible to cancel the thermal deviation of channel wavelengths in a mixed silica-polymer system. Thus, the inventive organic-containing overclad compositions allow precise adjustment of the overclad index, and provide for the athermalized characteristics.

In preferred embodiments of the invention, the optical waveguide devices comprise an organic-containing overclad which clads the silica waveguide circuit core. The organic-containing overclad preferably encapsulates the silica waveguide circuit core supported by a planar substrate wherein light guided by the silica waveguide circuit core, the organic-containing overclad, and the planar substrate propagates in the silica waveguide circuit core, organic-containing overclad, and planar substrate.

In preferred embodiments of the invention, the organic-containing overclad has a negative variation of refractive index versus temperature (dn/dT), and is selected such that the organic-containing overclad dn/dT inhibits the shift of channel center wavelengths to less than about 0.10 nm, preferably less than about 0.05 nm when the device is subjected to temperature variations in the range of 0° to 70° C. More preferably, the organic-containing overclad and the negative variation of refractive index versus temperature dn/dT are selected to inhibit shifts of channel center wavelengths to less than about 0.01 nm.

The precise range of organic-containing overclad index useful for athermalizing devices depends on parameters such as core index, core dn/dT and core dimensions. In particular, the upper limit is determined by losses in curved waveguides and depends on the radius of curvature of waveguide circuit core. In a preferred embodiment, the core index is about 1.35 to 1.60, preferably about 1.40 to 1.50. More preferably the core index is about 1.455±0.002 at 1550 nm, 20° C., with core dn/dT assumed to be equal to that of silica ($10^{-5°}$ C.$^{-1}$), and core dimensions are about 6×6.5 µm. In this case, the refractive index of the organic-containing overclad is in the range of 1.430 to 1.450 at 1550 nm, 20° C., most preferably between about 1.437 and about 1.447 at 1550 nm, 20° C.

Preferred organic-containing overcladdings of the invention comprise polymers and/or copolymers containing fluorinated monomers, preferably wherein the fluorinated monomers are selected from the vinylic, acrylic, methacrylic or allylic families (group consisting of vinylics, acrylics, methacrylics and allylics). The copolymers containing fluorinated monomers are preferably synthesized with a free-radical process (thermally-induced or photo-induced). The organic-containing overclads can be comprised of polymers or copolymers containing other families such as fluorodioxole. If the refractive index of the core material is higher than 1.5 at 1550 nm (with a different doping of the core material), new families could be used such as fluorinated polyimides. Pentafluorostyrene (5FS), trifluoroethylmethacrylate (3FEMA), pentadecafluorooctylacrylate (15FOA), pentafluorobenzylacrylate (5FBA), (see FIG. 1), combinations thereof, and the like are the preferred fluorinated monomers of the organic-containing overclads of the invention. One skilled in the art, however, is able to use other fluorinated monomers. such as trifluoroethylacrylate (3FEA) or hexafluoropropylacrylate (6FPA) (see FIG. 1), in organic-containing overclads of the invention.

The choice of the monomers comprised in the copolymer affects not only the refractive index but also the dn/dT of the copolymer. Typically polymers present dn/dT in the range of $-1 \times 10^{-4°}$ C.$^{-1}$ below their temperature of glass transition (Tg) and in the range of $-3 \times 10^{-4°}$ C.$^{-1}$ above their Tg. By changing the polymer formulation, it is possible to adjust the Tg, then the dn/dT. Pentafluorostyrene, methacrylates, short side chains (methyl or ethyl) on the monomers tend to increase the Tg of the copolymer. 5FS, 3FEMA are preferred monomers for high Tg – less negative dn/dT copolymers. Acrylates, long side chains monomers tend to lower the Tg of the copolymer. 5FBA, 15FOA, 6FPA, are preferred monomers for low Tg – very negative dn/dT copolymers.

Figure 1:
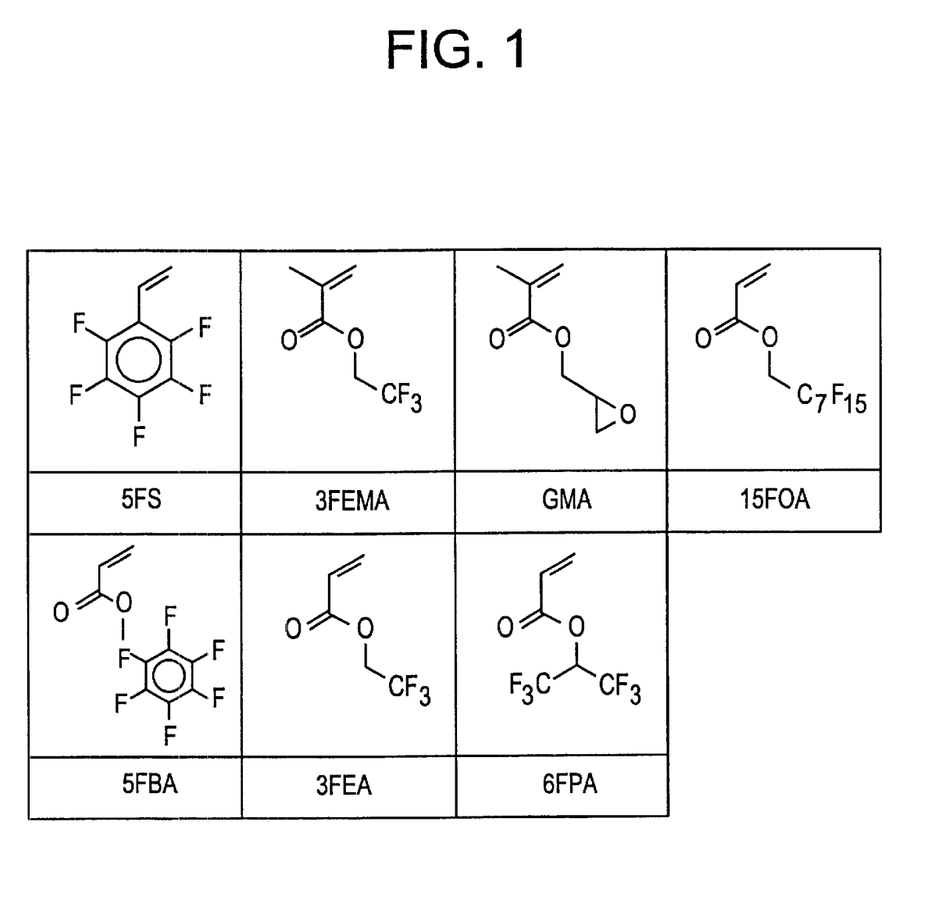
FIG. 1 depicts preferred monomer units of preferred polymer claddings of the invention which include pentafluorostyrene (5FS), trifluoroethylmethacrylate (3FEMA), glycidyl methacrylate (GMA), pentadecafluorooctylacrylate (15FOA), pentafluorobenzylacrylate (5FBA), trifluoroethylacrylate (3FEA), and hexafluoropropylacUate (6FPA).

Preferred organic-containing overclads are improved when a difunctional methacrylate-epoxy monomer is added, particularly when the difunctional methacrylate-epoxy monomer is glycidyl methacrylate (GMA) (see FIG. 1). Although not intending to be bound by theory, it is believed that the difunctional methacrylate-epoxy monomer provides for cationical and/or thermal cross-linking of the copolymers after the organic-containing overclad has been deposited over a doped waveguide core and planar substrate. One skilled in the art, however, is able to use other difunctional monomers providing for the cross-linking of the copolymers of the invention. The overclad is preferably laid from the copolymers in solution. Typically, the overclad is cast by spin coating, alternatively by dip-coating. The solvent used to dissolve and lay the copolymer of the invention may be selected from tetrahydrofuran, chloroform, methylene chloride, toluene and other aromatic solvents, solvents from the ester and the ketone families. Good results are obtained with ethyl acetate, butyl acetate, or butanone.

An improved polymer overclad is also obtained when using an adhesion promoter. The preferred adhesion promoters are from the silane family. Good results are obtained with glycidoxypropyl trimethoxy silane (GlyMo), mercaptopropyl trimethoxy silane (MPMo), gamma-aminopropyl trimethoxy silane (GAPS) and the like. The adhesion promoters can be used as a surface treatment on the device before casting the polymer overclad. Alternatively, the adhesion promoter can be mixed to the solution of the polymer of the invention used to coat the device and form the overclad.

A preferred organic-containing cladding of the invention comprises about 25–65 wt. % of trifluoroethylmethacrylate (3FEMA), about 10–75 wt. % of pentafluorostyrene (5FS) and about 0–30 wt. % of glycidyl methacrylate (GMA). The monomer mixture is preferably polymerized via free-radical process. A preferred free-radical initiator is about 0.1–5 wt. % 4,4'-azobis (4-cyanovaleric acid) (ADVN) overall monomer concentration. The polymerization is preferably run in solution. In a preferred embodiment, the polymerization mixture is comprised of 50–95 wt. % tetrahydrofuran (THF).

Another preferred organic-containing cladding of the invention comprises about 30–80 wt. % of pentafluorostyrene (5FS), about 20–40 wt. % of pentadecafluorooctylacrylate (15FOA) and about 0–30 wt. % of glycidyl methacrylate (GMA). The monomer mixture is preferably polymerized via free-radical process. A preferred free-radical initiator is about 0.1–5 wt. % 4,4'-azobis(4-cyanovaleric acid) (ADVN) overall monomer concentration. The polymerization is preferably run in solution. In a preferred embodiment, the polymerization mixture is comprised of 50–95 wt. % tetrahydrofuran (THF).

In preferred embodiments of the invention, the organic-containing overcladding comprises a copolymer referred to herein as "Copolymer epoxy 9". Copolymer epoxy 9 is prepared by polymerizing about 60 wt. % 5FS, about 30 wt. % 3FEMA, and about 10 wt. % GMA. 1 wt. % of ADVN free radical initiator is added to the mixture which is dissolved in THF. The overall concentration of monomer in THF is usually in the range 5–50 wt. %. The solution is stirred and warmed at 70° C. for 16 hours. The copolymer is then isolated and purified by precipitation in methanol. The copolymer refractive index n at 1550 nm, 20° C. is 1.447, as measured with a m-line prism coupler, and the dn/dT is about $-1 \times 10^{-4\circ}$ $C.^{-1}$, as measured by the backreflectance technique.

In other preferred embodiments of the invention, the organic-containing overcladding comprises a copolymer referred to herein as "Copolymer epoxy 16". Copolymer epoxy 16 is prepared by polymerizing about 67 wt. % 5FS, about 29 wt. % 15FOA, and about 4 wt. % GMA. 1 wt. % of ADVN free radical initiator is added to the mixture which is dissolved in THF. The overall concentration of monomer in THF is usually in the range 5–50 wt. %. The solution is stirred and warmed at 70° C. for 16 hours. The copolymer is then isolated and purified by precipitation in methanol. The copolymer refractive index n at 1550 nm, 20° C. is ca. 1.44, and the dn/dT at 1550 nm is $-1.4 \times 10^{-4\circ}$ $C.^{-1}$, as measured using the backreflectance technique.

Another preferred organic-containing cladding of the invention comprises about 45–100 wt. % of pentafluorobenzylacrylate (5FBA), about 0–25 wt. % of pentadecafluorooctylacrylate (15FOA) and about 0–30 wt. % of glycidyl methacrylate (GMA). Typically, the dn/dT of a copolymer prepared by polymerizing 60 wt. % 5FBA, 35 wt. % 15FOA, and 5 wt. % GMA, is about $-3 \times 10^{-4\circ}$ $C.^{-1}$.

In another preferred embodiment of the invention, a sol-gel overclad, preferably a hybrid sol-gel material, is employed as the organic-containing overclad rather than a polymer. A unique capability of the hybrid sol-gel materials is that the dn/dT can be continuously tuned by varying the composition from pure $SiO_2$ to $R-SiO_{2/3}$, where R is an organic side group. The most significant change in this composition range is the average network coordination number, which for silica is 4 and for the silsesquioxane is 3. The addition of one network coordinate bond increases the compaction and stiffness of the matrix, and is the primary factor that differentiates physical properties. One physical property that affects the index of refraction is the coefficient of thermal expansion, through the molar volumetric refractivity. It has been recognized that the dn/dT scales with the CTE. Therefore, compositional approaches can be developed to tune the dn/dT by using average network coordination to affect the CTE of the material. Pure $SiO_2$ has an expansion of $5.5 \times 10^{-7}/°$ C., whereas $R-SiO_{2/3}$ compounds have expansions in the $200 \times 10^{-6}/°$ C. range. Incorporation of four-fold coordinate silica into three-fold coordinate hybrid shifts the expansion to significantly lower values and therefore shifts the dn/dT towards $+1 \times 10^{-5}/°$ C. (the value for silica) from $-3 \times 10^{-4}/°$ C. (the value for silsesquioxanes). A nearly linear relationship of CTE with the average network coordination number in a composition has been measured. Similarly, the value of dn/dT can be assumed to depend on the $SiO_2$ content of the hybrid material. A desired value of dn/dT can be made by appropriately balancing the three and four-fold coordinate silicon atom content in the composition. The organic sidegroups R can be chosen to set the index of refraction, and to slightly modify the dn/dT. To make a hybrid sol-gel material with dn/dT of $\times 1 \times 10^{-4}/°$ C., a composition with 60% $SiO_2$ and 40% $R-SiO_{2/3}$ is needed. To further refine the composition so that an index of 1.444 is achieved, the 40% three-fold coordinate silicon may be comprised of 75% ethylsilsesquioxane, and 25% phenyl silsesquioxane. Precursors with other organic sidechains may be used, and their effect on the index may require independent optimization. A typical formulation for the above-mentioned hybrid material with $dn/dT=-1 \times 10^{-4}/°$ C, and n=1.444 is provided below. Briefly, 40.4 cc of TEOS is diluted with 60 cc IPA and is reacted with between 1.5 and 2.0 cc $H_2O$ and 0.28 cc $HNO_3$. The reaction is allowed to proceed for 60 minutes at 45° C. before addition of between 1.5 and 2.0 cc $H_2O$. After an additional 30 minutes of reaction at 45° C., 0.9 cc of PDMS, 17.4 cc of ETMS, and 6.4 cc of PTES are added. Finally, between 3.8 and 4.5 cc of $H_2O$ are added and reacted for 30 minutes before cooling. Prior to use, the sol is distilled to 50% of its volume to afford a water clear sol. The choice of water content primarily affects the cure rate properties of the material, faster rates being achieved with higher water content.

The mechanism used for tuning the dn/dT is to compositionally change the average network connectivity of the silicon atoms. The silica component of the hybrid is supplied by the tetraethoxysilane precursor and the silsesquioxane component by alkoxyorganosilanes. Since both react via hydrolysis and condensation reactions, the mixture of the three- and four-fold coordinate silicon atoms in the final product is expected to be microscopically homogeneous. Therefore, properties such as the index of refraction are expected to be uniform over sub-micron distances in the optical path, which is critical for retention of acceptable performance in optical circuits.

The sol-gel based compositions of the invention possess low optical loss, a means of controlling the index of refraction, and a negative shift of the index of refraction with increased temperature. The compositions of the invention include, but are not limited to, those compositions recited in WO 98/26315, WO 98/25862, and U.S. Provisional Application No. 60/118,946 filed Feb. 5, 1999 of S. Dawes and R. Hagerty, each of which is incorporated herein by reference in its entirety. These compositions are particularly suitable in the present invention because of the low optical loss at 1550 nm, good thermal durability, good resistance to damp heat environments, ability to tailor index of refraction compositionally, and negative thermal coefficient of index of refraction (dn/dT).

The dn/dT value of a composition comprising molar fractions of about 8% polydimethylsiloxane, about 68% methyltriethoxysilane, about 8% phenyltrifluorosilane, and about 16% phenyltriethoxysilane was measured in a ball termed backreflectance apparatus. A cleaved end of a fiber was dipped into a sol precursor, and cured to 250° C. The sol-gel ball term served to scatter all transmitted light. A standard backreflectance measurement then provided information on the reflected light from the fiber/sol-gel interface. The ball termed fiber was placed into an oven along with an independent thermocouple, and reflectance measurements acquired at several temperatures between 20° C. and 100° C. The value of the index can be calculated from the reflectance using the equation: $R=(n_2-n_1)/(n_2+n_1)$. A substantially linear temperature dependence of the index was found, and the value of the dn/dT was established as $-3 \times 10^{-4}/°$ C. This value is both opposite in sign and much higher in magnitude than the dn/dT of silica. The magnitude of the negative dn/dT is explained by the high thermal expansion coefficient $(200 \times 10^{-6}/°$ C.) of the cured hybrid sol-gel materials. The rapid change in volume reduces the molar refractivity of the material and induces a negative change in the index.

To demonstrate that organic-containing materials can be used to effect a change in the $d\lambda/dT$ properties of a phasar, a preferred device was prepared as follows. A silica wafer was provided with a core layer, which was etched to a desired waveguide pattern using standard lithography and reactive ion etch techniques widely known to those skilled in the art. A hybrid sol-gel overclad layer was cast onto the core structure to provide a 20 to 50 µm thick layer. The index of refraction of the sol-gel layer was 1.447 at 1550 nm and 21° C. The clad layer in such a structure carries about 10% of the light in a single mode. The device was trimmed on the input and output to reveal the waveguides and then the sample was measured. The phasar performance was measured at 21° C., 40° C., and 50° C. The phasar provided well-defined signals on the output channels, with rather high loss and adjacent channel crosstalk, and good nonadjacent channel crosstalk. In addition, the wavelength shift in each channel was $-3.5 \times 10^{-2}/°$ C., which is opposite the shift in silicate based core/clad compositions, and roughly three to four times greater in magnitude. Both the size and the direction of the wavelength shift are in rough agreement with the analysis of the dn/dT and f+/f– characteristics of the waveguide.

The loss in the device was 6 dB higher than would be expected in a silicate overclad device, and the losses can arise from coating thickness non-uniformity, machining damage to the substrate/overclad interface, inexact index match, and intrinsic loss of the sol-gel material. The adjacent crosstalk was affected by bubble flaws that were entrapped in the overclad layer in the phase array section of the device. The good non-adjacent crosstalk values indicate that the index homogeneity was minimal. Despite the high expansion of the sol-gel, very low polarization effects were observed. The results indicate that the stresses on the system were roughly a third less than that in silicate systems. This result agreed with the independent stress measurements made on films of hybrid sol-gel materials on silica. Low stresses arise from the low temperature process along with low modulus of the hybrid material.

Another phased array demultiplexer was overcladded with a polymer having a dn/dT of the order of $-1 \times 10^{-4°}$ C.$^{-1}$. The phasar was prepared by patterning a doped silica core layer by photolithography and reactive ion etching. The core layer was supported on a fused silica substrate. The core layer index (at 1550 nm) and thickness were 1.453 and 6.8 µm respectively, as measured with a m-line prism coupler. The waveguide linewidth was found to be 6.1 µm. The phased array device was then overcladded with the copolymer epoxy 9 of the invention described above, by spincoating a solution of 35 wt. % of copolymer epoxy 9 in 65 wt. % of ethyl acetate on the device.

Figure 2:
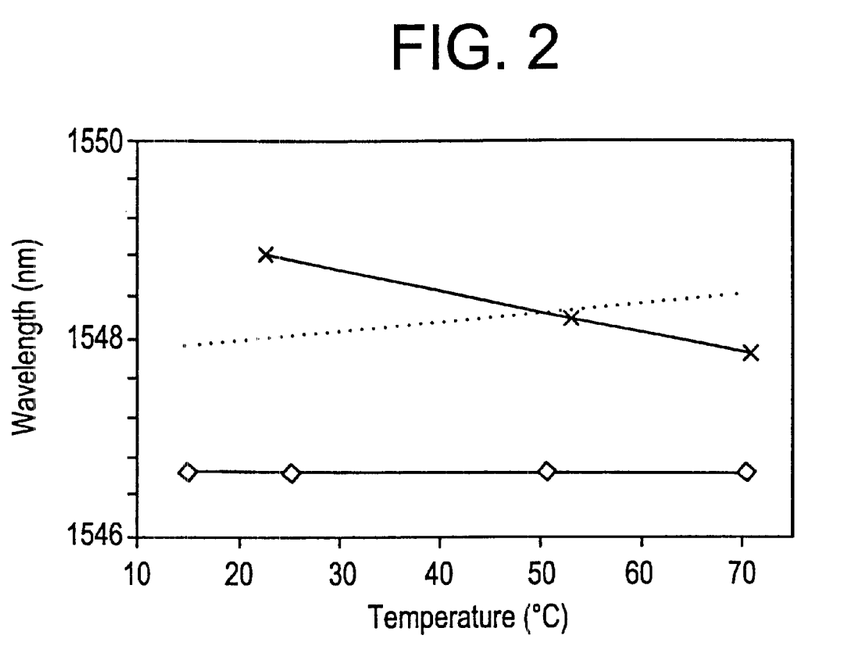
FIG. 2 shows a plot of the mean channel wavelength versus temperature for a phased array wavelength division demultiplexer device with a doped silica overclad (dotted line; $d\lambda/dT=+0.01$ nm/° C.), for a phased array wavelength division demultiplexer device overcladded with the fluorinated copolymer epoxy 9 of the invention (solid line with crosses), and for a phased array wavelength division demultiplexer device overcladded with the fluorinated copolymer epoxy 10 of the invention (solid line with diamonds).

The device overcladded with copolymer epoxy 9 was measured at 23, 53 and 71° C. The temperature was varied by laying the device on a Peltier element. A plot of the mean channel wavelength versus temperature is shown in FIG. 2 (solid line with crosses). The slope of the curve is −0.02 nm/° C., which is still opposite in sign to the shift in a silicate glass overcladded device (FIG. 2, dotted line).

In order to further reduce the wavelength temperature dependence of the devices, another phasar was overcladded with a polymer having a dn/dT of the same order as copolymer epoxy 9 (ca. $-1 \times 10^{-4°}$ C.$^{-1}$), and a smaller refractive index at 1550 nm, 20° C. A smaller clad index induces a smaller fraction of guided light in the clad, and thus a smaller weight of the polymer negative dn/dT in the effective dn/dT of the waveguide. As previously the phasar was prepared by patterning a doped silica core layer supported on a silica substrate. The core layer index (at 1550 nm) and thickness were 1.453 and 6.8 µm respectively. The waveguide linewidth was found to be 6.3 µm. The polymer that was used to overclad this phasar device is referred to herein as "Copolymer epoxy 10". Copolymer epoxy 10 was prepared by polymerizing about 35 wt. % 5FS, 55 wt. % 3FEMA, and 10 wt. % GMA. The same procedure as for copolymer epoxy 9 was used to prepare the copolymer and spin-coat the device. The copolymer layer refractive index at 1550 nm, 20° C. was 1.434.

The device overcladded with copolymer epoxy 10 was measured at 15, 25, 50 and 70° C. A plot of the mean channel wavelength versus temperature is shown in FIG. 2 (solid line with diamonds). These measurements show that the mean channel wavelength remains in a range of 0.05 nm between 15 and 70° C. Copolymer epoxy 10 thus enables athermalization of phased array multiplexer/demultiplexer devices.

However, the fundamental mode of waveguides overcladded with copolymer epoxy 10 is assumed to be very asymmetrical due to the low refractive index of this copolymer, especially at temperatures above room temperature. As a result, the coupling loss with a standard (SMF 28) fiber is increased by ca. 0.3 dB per interface, as estimated using an optical modeling software. Thus, using a copolymer with a refractive index close to silica (at least near room temperature), such as copolymer epoxy 9, is desirable.

In order to compensate for the negative wavelength-temperature dependence occuring with organic-containing overclad materials of refractive index close to silica, and of dn/dT values smaller than ca. $-8 \times 10^{-5°}$ C.$^{-1}$, such as copolymer epoxy 9 or the hybrid sol-gel material described above, the organic-containing overclad material may be associated to a silicate glass material with positive dn/dT, as described hereafter.

Different patterns of organic-containing overclad are within the present invention and include local overclad, bi-layer overclad, and hybrid overclad. Local overclad is characterized by local deposition of a silica clad on a portion of the device followed by a coating with organic-containing overclad on the remainder of the device. Bi-layer overclad is characterized by a bilayer made of a first layer of silica and a second layer of organic-containing overclad material. Hybrid overclad is characterized by a clad made of silica nano-particles embedded in a polymer matrix. The term organic-containing material more particularly describes polymers and hybrid organic/inorganic sol-gels.

Local Overclad

Figure 3A:
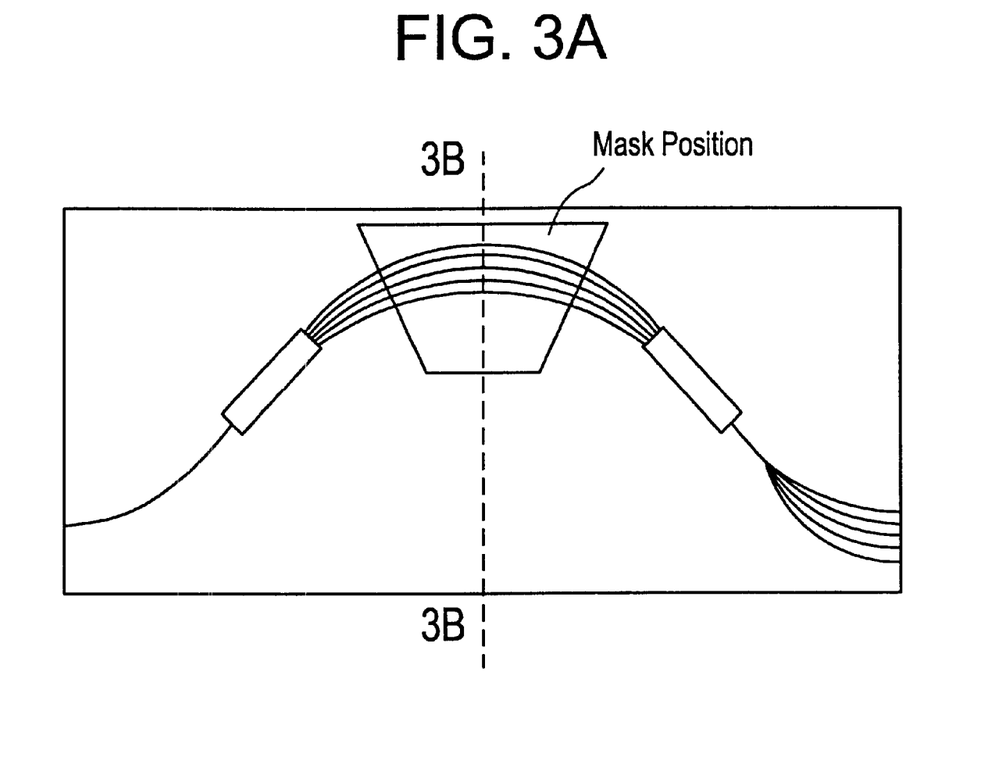
FIG. 3A is a schematic top view of a preferred integrated optical waveguide circuit phased array wavelength division multiplexer/demultiplexer device. Also shown is the position of the mask used for local overclad deposition.
Figure 3B:
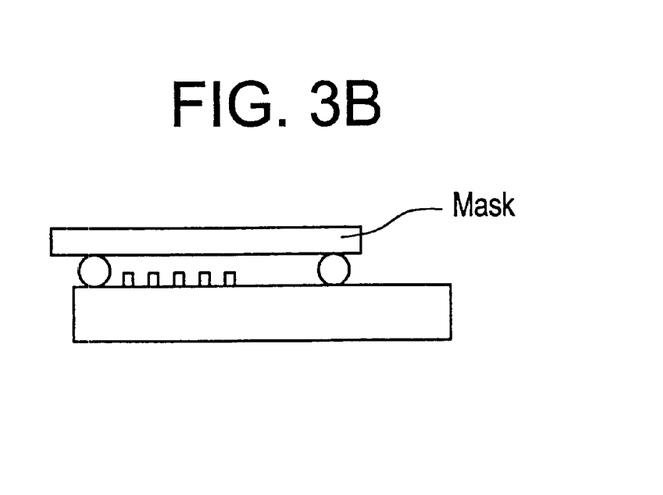
FIG. 3B shows a cross-sectional left side view of the device of FIG. 3A along dashed line AA' which comprises an uphold enabling the mask to be held above the ridge.

In the local overclad method, a glass overclad is deposited only locally on the waveguides as shown in FIG. 3A, in order to provide the organic-containing material in a limited region of the overclad. More light can be exposed to the organic-containing region, over a shorter length. This can be accomplished by masking the region during deposition of the glass overclad. The mask, which can be a thin silica sheet, can be held above the waveguides by means of upholds, as shown in FIG. 3B. If the sheet is thin enough, it can be cut far from the waveguides and removed after glass overclad deposition. The portion of the device that was masked during glass overclad deposition is then overcladded with the organic-containing material.

The position of the edges of the silica sheet that cross the waveguides must be precisely determined in order to obtain a constant path length difference in the glass overcladded region $\Delta L_g$, and a constant path length difference in the organic-containing overcladded region $\Delta L_p$ with $\Delta L_g + \Delta L_p = \Delta L$. The mean channel wavelength $\lambda_0$ is now determined by $m \times \lambda^0 = n^g \times \Delta L_g + n_p \times \Delta L_p$, where $n_g$ is the effective index of glass overcladded waveguides and $n_p$ is the effective index of organic-containing overcladded waveguides. In order to obtain an athermalized device, the ratio of $\Delta L_p$ to $\Delta L_g$ preferably equals in first approximation (neglecting the CTE term) the ratio of $dn_g/dT$ to $-dn_p/dT$. An advantage of the local overclad method is that near the edges of the device, the overclad can comprise glass. Thus, standard pigtailing techniques (used for full glass devices) can be employed to connect the input and output waveguides with the fibers that carry the optical signal.

Bi-Layer Overclad

In another embodiment of the invention, the organic-containing overclad is applied using the bi-layer method. In this method, a glass overclad layer and an organic-containing overclad layer are superimposed as shown schematically in FIG. 4. The configuration is tailored so that only the desired fraction of light passes through the negative dn/dT region to balance the effective index of refraction according to Equation II: $f_-\times(dn_-/dT) = f_+\times(dn_+/dT)$, where the fraction in the negative $dn_-/dT$ material is indicated by $f_-$ and the fraction in the positive $dn_+/dT$ materials is indicated by $f_+$. Preferably, a bi-layer overclad can be applied in two different manners: etched glass overclad and thin glass overclad.

Figure 5A:
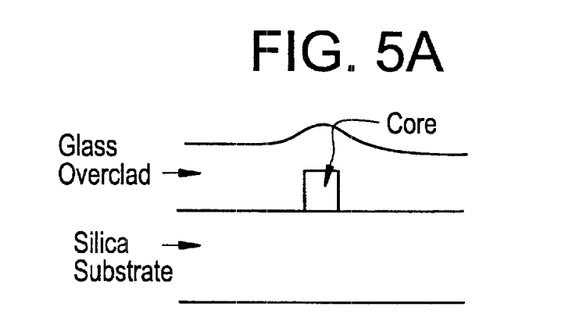
FIG. 5A shows a cross-section view of a preferred waveguide with a thick glass overclad, showing the small pattern remaining at the overclad surface above the waveguide.
Figure 5B:
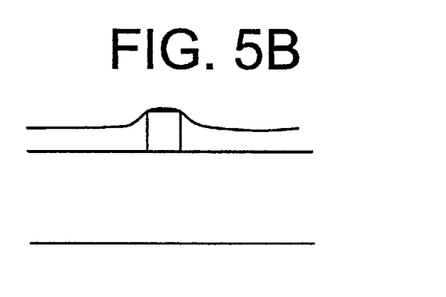
FIG. 5B shows a cross-section of the preferred waveguide depicted in FIG. 5A after etching.
Figure 5C:
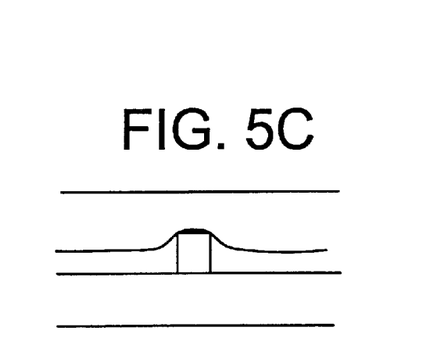
FIG. 5C shows a cross-section of the preferred waveguide depicted in FIG. 5B after depositing a layer of an organic-containing material, thus achieving a bi-layer overclad.

In the etched glass overclad method, a thick glass overclad is first deposited on the waveguides. Typically, a small pattern remains at the overclad surface along the waveguides (see FIG. 5A). Then the glass overclad is etched until reaching the top side of the waveguide core (see FIG. 5B). An optional lithography masking method can be used to etch the device in the phased array region only, for easier pigtailing at the device input/outputs. Since only etching is needed to remove overclad, no highly precise patterning is needed. The device is then overcladded with an overclad material of the invention.

Figure 4:
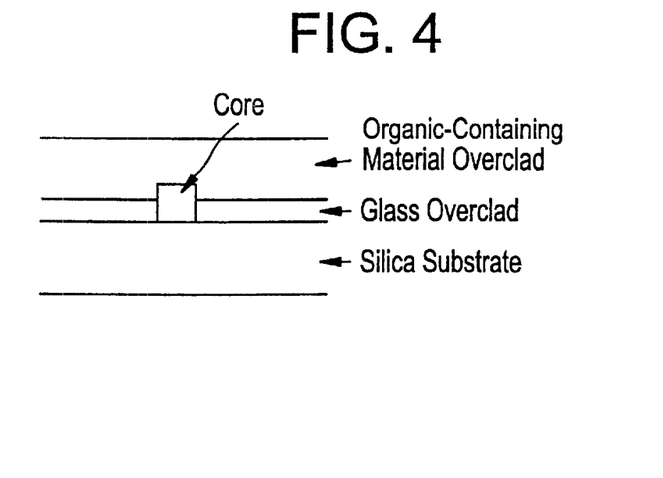
FIG. 4 shows a cross-section schematic view of a preferred waveguide with a preferred bi-layer organic-containing overclad.

The effective index of such waveguides with the approximate shape of FIG. 4 has been calculated using optical modeling software. The following sets of parameters were used:

wavelength: 1550 nm core width and height: 6 μm×6.5 μm silica CTE: $5.5\times10^{-7\circ}$ C.$^{-1}$ silica substrate and glass overclad indices at 0° C.: 1.444 core index at 0° C.: 1.455 (corresponding to a Δ of 0.75%)

silica substrate, glass overclad and core dn/dT's: $10.5\times10^{-6\circ}$ C.$^{-1}$ (assumed to be equal to silica dn/dT in the visible range)

organic-containing overclad index at 0° C.: 1.443, 1.444, or 1.445 glass overclad thickness remaining on both sides of the waveguides after etching: 3 μm or 5 μm.

Figure 6A:
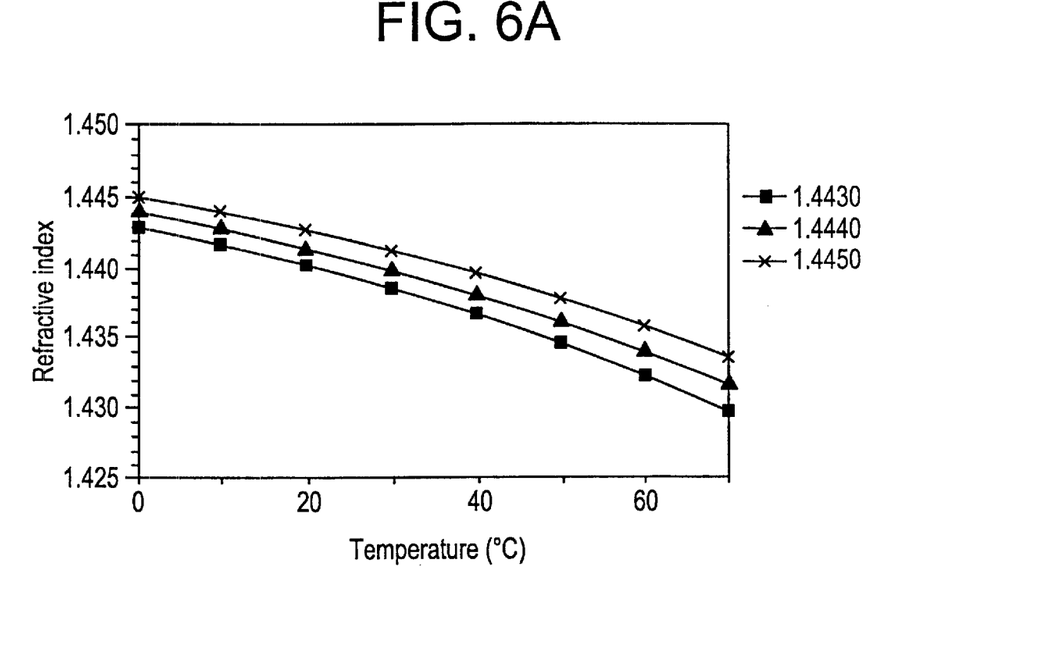
FIGS. 6A and 6B show graphs of desired theoretical n(T) (index versus temperature) curves of the organic-containing material for athermalization in the etched glass overclad bi-layer method, with 3 $\mu$m (6A) and 5 $\mu$m (6B) thick glass overclad and different n(0° C.) values for the organic-containing material.
Figure 6B:
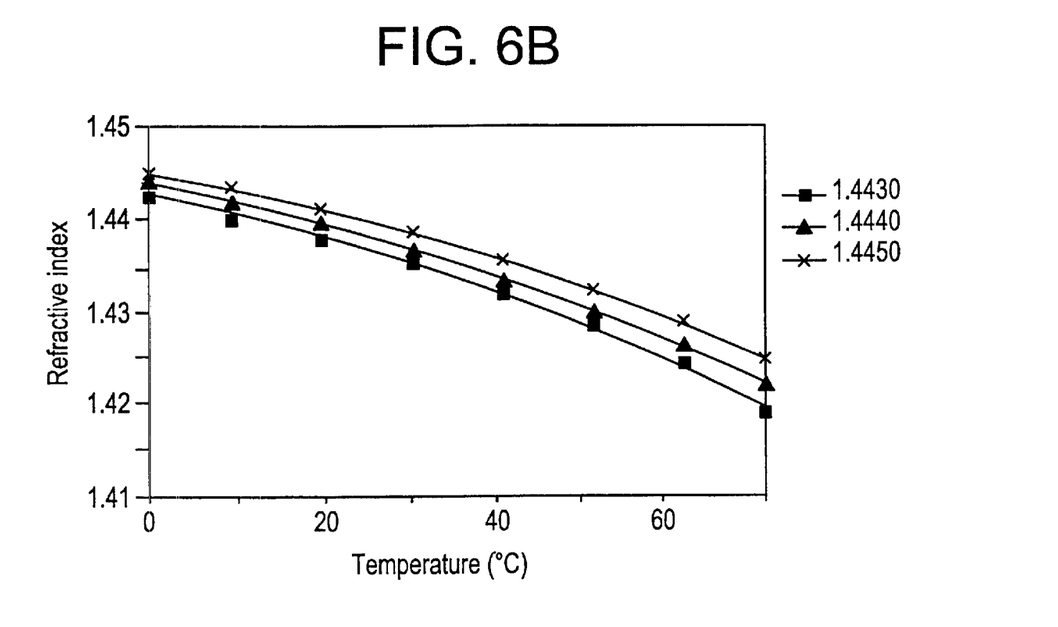

For each of the six sets of parameters (corresponding to different organic-containing material indices and glass overclad thicknesses), the effective index at 0° C. was first calculated. Then at higher temperatures T (from 10 to 70° C. by steps of 10° C.) the effective index $n_{eff}(T)$ desired for athermalization was calculated using Equation 1 and the organic-containing material index desired to obtain the effective index $n_{eff}(T)$ was calculated with commercially available optical modeling software. The results are shown in FIG. 6A (3 μm thick glass overclad) and 6B (5 μm thick glass overclad). FIGS. 6A and 6B show that the dn/dT of the organic-containing material preferably becomes more negative at higher temperatures, which is the case for utilized polymers. The average dn/dT between 0 and 70° C. is preferably about $(-1.8\pm0.2)\times10^{-4\circ}$ C.$^{-1}$ in the case of 3 μm thick glass overclad and preferably about $(-3.3\pm0.2)\times10^{-4\circ}$ C.$^{-1}$ in the case of 5 μm thick glass overclad. An advantage of the present method is that pigtailing is facilitated because the edges of the device are overcladded with glass.

A phased array demultiplexer was overcladded using the etched glass overclad method. The phasar was prepared by patterning a doped silica core layer by photolithography and reactive ion etching. The core layer was supported on a fused silica substrate. A glass overclad was then deposited by flame hydrolysis deposition, consolidated at 1240° C. for ¾ hr and then partially etched away, leaving about 2 μm of overclad above the waveguides. The phased array device was then overcladded with the copolymer epoxy 16 (described above) by spin-coating a solution of 35 wt. % of copolymer epoxy 16 in 65 wt. % of ethyl acetate on the device.

Figure 7:
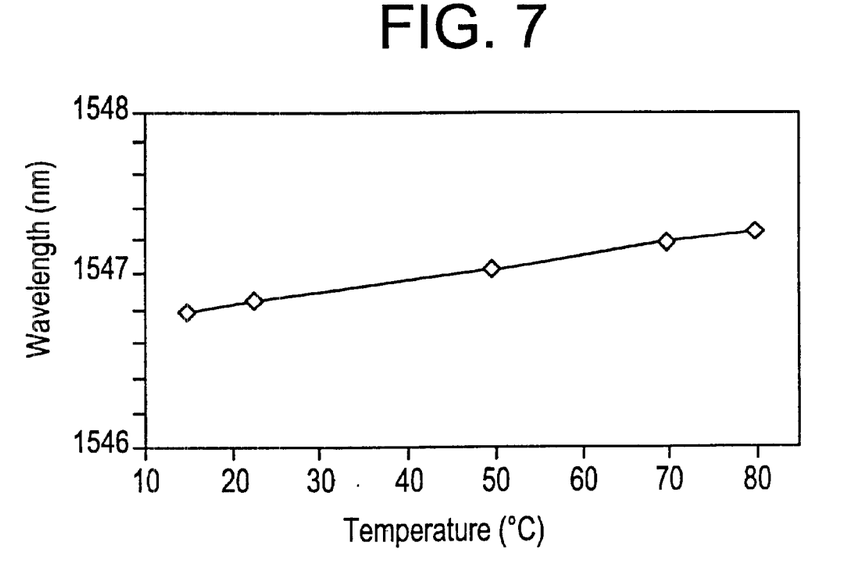
FIG. 7 shows a plot of the mean channel wavelength versus temperature for a phased array wavelength division demultiplexer device with a bi-layer overclad of the invention comprising an etched silicate glass part and a polymer part consisting of fluorinated copolymer epoxy 16.

The device overcladded with copolymer epoxy 16 was measured at 15, 23, 50, 70 and 80° C. A plot of the mean channel wavelength versus temperature is shown in FIG. 7. The slope of the curve is +0.007 nm/° C., which is slightly smaller than the shift in a silicate glass overcladded device (+0.01 nm/° C.). A greater impact of the negative dn/dT overclad would have been achieved if the glass overclad had been more deeply etched away.

Figure 8:
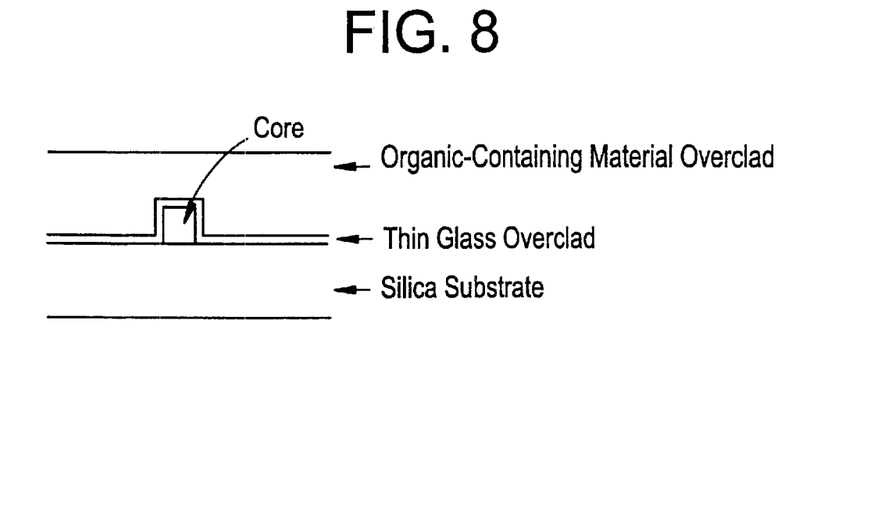
FIG. 8 is a cross-section view of a preferred waveguide overcladded by the thin glass overclad method of the invention.
Figure 9:
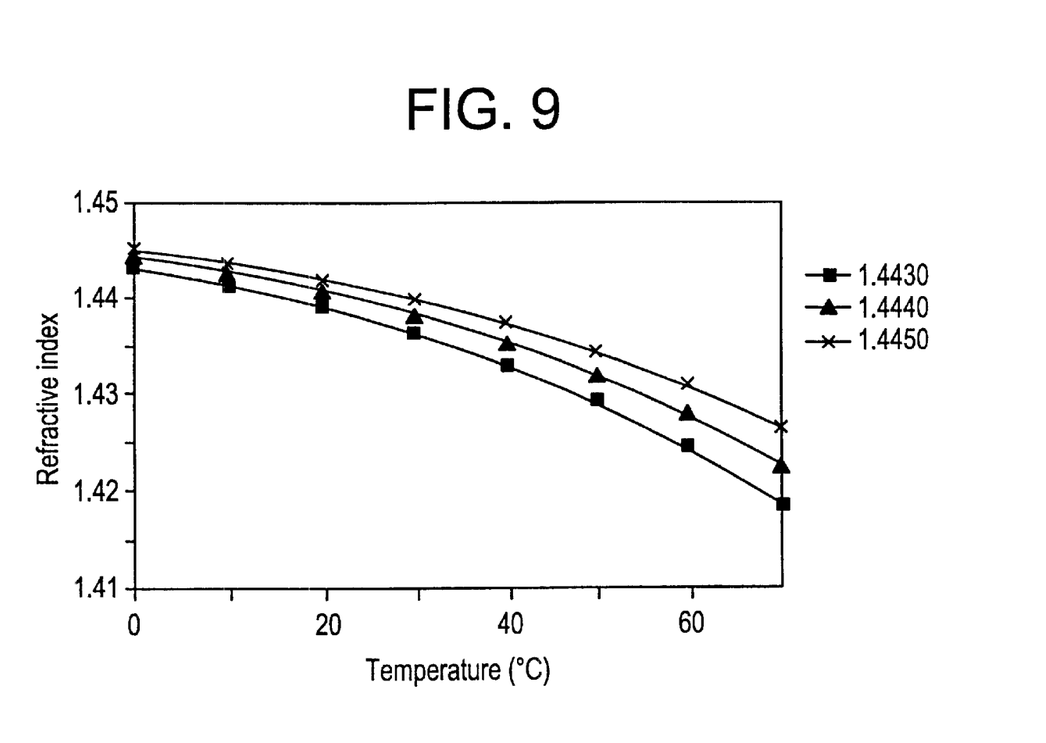
FIG. 9 is a graph of desired theoretical n(T) (index versus temperature) curves of the organic-containing material for athermalization in the thin glass overclad bi-layer method, with a glass overclad of 0.5 $\mu$m thickness and different n(0° C.) values for the organic-containing material.

In another embodiment of the invention, a second bi-layer method can be employed. The thin glass overclad method comprises first depositing a very thin glass overclad layer on a device followed by overcladding with a negative dn/dT organic-containing material. A cross-section of such a waveguide is depicted in FIG. 8. Theoretical n(T) curves were calculated as described above for the etched glass overclad method. Curves for a glass overclad thickness of 0.5 μm are shown in FIG. 9. The dn/dT of the organic-containing material becomes more negative at higher temperatures. The average dn/dT between 0 and 70° C. is preferably about $(-3.0\pm0.4)\times10^{-4\circ}$ C.$^{-4}$ for the glass overclad thickness of 0.5 μm. An advantage of the present method is the manufacturability and economical approach of the procedure. In addition, the thickness of the glass overclad can be easily tuned to adjust the channel wavelength shift to zero. In a preferred embodiment, an optimal glass overclad thickness (tuned thickness) for the device core waveguide and −dn/dT organic containing overclad is determined to minimize channel wavelength shift. The device is then provided with such a tuned glass overclad thickness which inhibits channel wavelength shift.

Hybrid Overclad

In another preferred embodiment of the invention, the hybrid overclad method is employed. In the hybrid method, the overclad is preferably made by mixing a polymer overclad material with silica nano-particles. The mixture of the negative dn/dT polymer with positive dn/dT silica provides a material with a less negative dn/dT, suitable for overcladding the device of the invention. The presence of epoxy groups in the polymer and the use of an adhesion promoter such as, for example, glycidoxypropyl trimethoxysilane or mercaptopropyl trimethoxysilane, or the like, provides compatibility between the glass and polymer and provides good dispersion of the silica particles with no phase separation. Silica nano-particles with diameters smaller than 10 nm are preferred and are commercially available. The hybrid material polymer/silica nano-particles is transparent in the visible-near IR range and the domains of different index are preferably too small to increase the propagation losses at 1.55 μm.

It will be apparent to those skilled in the art that various modifications and variations can be made in the methods, compositions, and devices of the present invention without departing from the spirit or scope of the invention. Thus, it is intended that the present invention covers the modifications and variations of this invention provided they come within the scope of the appended claims and their equivalents.

What is claimed is:

1. An athermalized optical telecommunications wavelength division multiplexer/demultiplexer integrated waveguide circuit device, said device comprising:
   a planar substrate including a waveguide undercladding, which can be a buffer layer or the substrate itself;
   a doped silica waveguide circuit core supported on said planar substrate, wherein said silica waveguide circuit core includes a multiplexing/demultiplexing circuit region for multiplexing/demultiplexing a plurality of optical telecommunications wavelength channels;
   an inhomogeneous waveguide circuit overcladding including a first waveguide overcladding material and a second waveguide overcladding material;
   wherein said device guides optical telecommunications light in a waveguide core power distribution, in a waveguide undercladding power distribution and in a waveguide overcladding power distribution, wherein a first portion of light guided in said waveguide overcladding power distribution is guided through said first waveguide overcladding material and a second portion of light guided in said waveguide overcladding power distribution is guided through said second waveguide overcladding material such that a thermally induced wavelength shift in the channel wavelengths of said multiplexing/demultiplexing device is inhibited to less than 0.10 nm when said device is subjected to a temperature variation within the range of 0 to 70° C.

2. The device of claim 1 wherein said first waveguide overcladding material is an organic containing optical material and said second waveguide overcladding material is an inorganic optical material.

3. The device of claim 2 wherein the organic containing optical material is a polymer or copolymer of a fluorinated monomer selected from the group consisting of pentafluorostyrene, trifluoroethyl methacrylate, pentadecafluorooctyl acrylate, pentafluorobenzyl acrylate, hexafluoropropyl acrylate, trifluoroethyl acrylate, or a combination thereof.

4. The device of claim 2 wherein the organic containing optical material is a copolymer of monomers comprising trifluoroethyl methacrylate, pentafluorostyrene, and glycidyl methacrylate.

5. The device of claim 2 wherein one part of the device is overclad with the first waveguide overcladding material, and the other part of the device is overclad with the second waveguide overcladding material.

6. The device of claim 2 wherein the device has a bilayer overlclad, the bilayer overclad including the organic optical material formed on top of the inorganic optical material.

7. The device of claim 2 wherein the inorganic optical material is formed as particles embedded in the organic optical material.

8. The device of claim 1 wherein said first waveguide overcladding material has a negative variation in refractive index versus temperature and said second waveguide overcladding material has a positive variation in refractive index versus temperature.

9. The device of claim 8 wherein said first waveguide overcladding material negative variation in refractive index versus temperature is $<-5\times10^{-5}$° $C.^{-1}$ and said second waveguide overcladding material positive variation in refractive index versus temperature is $>5\times10^{-6}$° $C.^{-1}$.

10. The device of claim 1 wherein said thermally induced wavelength shift in the channel wavelengths of said multiplexing/demultiplexing device is inhibited to less than 0.05 nm.

11. The device of claim 1 wherein said device comprises at least one athermalizing cladding structure chosen from the group including a bilayer overclad, a local overclad, and a hybrid overclad.

12. The device of claim 2 wherein the device includes a phased array waveguide wavelength division multiplexer/demultiplexer.

13. A method of making an athermalized optical telecommunications wavelength division multiplexer/demultiplexer integrated waveguide circuit device comprising:
   providing a waveguide circuit core supported on a planar substrate including a waveguide undercladding, which can be a buffer layer or the substrate itself;
   said waveguide circuit core material and said waveguide undercladding material having a positive variation in refractive index versus temperature;
   said waveguide circuit core including a multiplexing/demultiplexing circuit region for multiplexing/demultiplexing a plurality of optical telecommunications wavelength channels;
   providing an inhomogeneous waveguide circuit overcladding including a first waveguide overcladding material and a second waveguide overcladding material;
   said first waveguide overcladding material having a negative variation in refractive index versus temperature and said second waveguide overcladding material having a positive variation in refractive index versus temperature;
   compensating said positive variation in refractive index versus temperature of said waveguide circuit core, of said waveguide undercladding material and of said second waveguide overcladding material by said negative variation in refractive index versus temperature of said first waveguide overcladding material, wherein either:
      light is guided by said waveguide circuit core, said waveguide undercladding material and said first waveguide overcladding material in one part of said device, and guided by said waveguide circuit core, said waveguide undercladding material and said second waveguide overcladding material in the other part of said device; or
      said first waveguide overcladding material is superimposed on said second waveguide overcladding material such that a first portion of light is guided by said waveguide circuit core, said waveguide undercladding material and said second waveguide overcladding material, while a second portion of light is guided by said first waveguide overcladding material; or
      said second waveguide overcladding material is mixed to said first waveguide overcladding material to produce a hybrid waveguide overcladding material and light is guided by said waveguide circuit core, said waveguide undercladding material and said hybrid waveguide overcladding material;
   such that a thermally induced wavelength shift in the channel wavelengths of said multiplexing/demultiplexing device is inhibited to less than 0.10 nm when said device is subjected to a temperature variation within the range of 0 to 70° C.

14. The method of claim 13 wherein said thermally induced wavelength shift in the channel wavelengths of said multiplexing/demultiplexing device is inhibited to less than 0.05 nm.

* * * * *